US00RE39970E

(19) United States
(12) Reissued Patent
Askew

(10) Patent Number: US RE39,970 E
(45) Date of Reissued Patent: Jan. 1, 2008

(54) DOWNHOLE ADJUSTABLE BENT HOUSING FOR DIRECTIONAL DRILLING

(75) Inventor: Warren Askew, Houston, TX (US)

(73) Assignee: Schlumberger Technology Corporation, SugarLand, TX (US)

(21) Appl. No.: 10/824,316

(22) Filed: Apr. 14, 2004

Related U.S. Patent Documents

Reissue of:
(64) Patent No.: 6,394,193
Issued: May 28, 2002
Appl. No.: 09/618,681
Filed: Jul. 19, 2000

(51) Int. Cl.
*E21B 7/04* (2006.01)

(52) U.S. Cl. ..... 175/61; 175/73
(58) Field of Classification Search ..... 175/61, 175/62, 73, 74, 269, 107, 317, 324, 75, 765; 166/50, 117.5
See application file for complete search history.

(56) References Cited

U.S. PATENT DOCUMENTS

| | | | |
|---|---|---|---|
| 4,067,404 | A | 1/1978 | Crase |
| 4,077,657 | A | 3/1978 | Trzeciak |
| 4,220,214 | A | 9/1980 | Benoit |
| 4,524,833 | A | 6/1985 | Hilts et al. |
| 4,577,701 | A | 3/1986 | Dellinger et al. |
| 4,596,294 | A | 6/1986 | Russell |
| 4,597,454 | A | 7/1986 | Schoeffler |
| 4,653,598 | A | 3/1987 | Schuh et al. |
| 4,697,651 | A | 10/1987 | Dellinger |
| 4,745,982 | A | 5/1988 | Wenzel |
| 4,789,032 | A | 12/1988 | Rehm et al. |
| 4,811,798 | A | 3/1989 | Falgout, Sr. et al. |
| 4,813,497 | A | 3/1989 | Wenzel |
| 4,834,196 | A | 5/1989 | Falgout, Sr. |
| 4,836,303 | A | 6/1989 | Boulet et al. |
| 4,884,643 | A | 12/1989 | Wawrzynowski et al. |
| 4,895,214 | A | 1/1990 | Schoeffler |
| 4,928,776 | A | 5/1990 | Falgout, Sr. |
| 4,932,482 | A | 6/1990 | DeLucia |
| 4,962,818 | A | 10/1990 | DeLucia |
| 4,991,668 | A | 2/1991 | Rehm et al. |
| 5,029,654 | A | 7/1991 | Wilson et al. |
| 5,042,597 | A | 8/1991 | Rehm et al. |
| RE33,751 | E | 11/1991 | Geczy et al. |
| 5,094,305 | A | 3/1992 | Wenzel |
| 5,101,914 | A | 4/1992 | Wenzel |
| 5,101,915 | A | 4/1992 | Witte |
| 5,117,927 | A | 6/1992 | Askew |
| 5,125,463 | A | 6/1992 | Livingstone et al. |
| 5,139,094 | A | 8/1992 | Prevedel et al. |
| 5,154,243 | A | 10/1992 | Dudman |
| 5,168,943 | A | 12/1992 | Falgout, Sr. |
| 5,181,576 | A | 1/1993 | Askew et al. |
| 5,297,641 | A | 3/1994 | Falgout, Sr. |
| 5,314,032 | A | 5/1994 | Pringle et al. |
| 5,363,929 | A | 11/1994 | Williams et al. |
| 5,368,109 | A | 11/1994 | Pittard, Jr. et al. |
| 5,441,119 | A | 8/1995 | Head |
| 5,445,230 | A | 8/1995 | Wattenburg et al. |
| 5,503,235 | A | 4/1996 | Falgout, Sr. |
| 5,520,256 | A | 5/1996 | Eddison |
| 5,535,835 | A | 7/1996 | Walker |
| 5,542,482 | A | 8/1996 | Eddison |

(Continued)

FOREIGN PATENT DOCUMENTS

AU 200027759 A1 10/2000

*Primary Examiner*—William P Neuder

(57) ABSTRACT

The present invention provides a hydraulically actuated downhole adjustable bent housing for use in directional drilling of bore holes and wells that allows adjustment of the housing from aligned to a bent configuration without raising or lowering the drillstring. The present invention also provides a method of directionally drilling a bore hole or a well using an downhole adjustable bent housing that can be operated without raising or lowering the drillstring.

17 Claims, 7 Drawing Sheets

U.S. PATENT DOCUMENTS 5,617,926 A * 4/1997 Eddison et al. ..... 175/61
5,638,910 A 6/1997 Noe et al.
5,725,061 A 3/1998 Van Steenwyk et al.
5,727,641 A 3/1998 Eddison et al.
5,735,357 A 4/1998 Palm
5,857,531 A 1/1999 Estep et al.
5,893,413 A 4/1999 Lembcke et al.
5,894,896 A * 4/1999 Smith et al. ..... 175/73
5,899,281 A 5/1999 Gynz-Rekowski
5,934,383 A 8/1999 Jurgens et al.
5,941,323 A 8/1999 Warren
6,109,372 A 8/2000 Dorel et al.

* cited by examiner

DOWNHOLE ADJUSTABLE BENT HOUSING FOR DIRECTIONAL DRILLING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention provides a downhole adjustable bent housing for use in directional drilling of wells used to recover oil and gas, and a method for directionally drilling a well to recover oil and gas.

2. Background of the Related Art

Wells are generally drilled to recover natural deposits of hydrocarbons and other desirable, naturally occurring materials trapped in geological formations in the earth's crust. A slender well is drilled into the ground and directed to the targeted geological location from a drilling rig at the surface. In conventional "rotary drilling" operations, the drilling rig rotates a drillstring comprised of tubular joints of drill pipe connected together to turn a bottom hole assembly (BHA) and a drill bit that are connected to the lower end of the drillstring. The BHA typically comprises a number of downhole tools including adjustable bent housings, drill collars and mud motors, and is generally within 30 feet of the drill bit at the end of the drillstring. During drilling operations, a drilling fluid, commonly referred to as drilling mud, is pumped down the interior of the drillpipe, through the BHA and the drill bit, and back to the surface in the annulus around the drillpipe. Mud motors are often used to rotate the drill bit without rotation of the drillstring. Pressurized mud pumped down the interior of the drillstring is used to power the mud motor that is mechanically coupled to and turns the nearby drill bit. Mud motors offer increased flexibility for directional drilling because they can be used with stabilizers or bent subs which impart an angular deviation to the BHA in order to deviate the well from its previous path and in the desired direction.

Surface adjustable bent housings are downhole tools that make up part of the BHA and are typically connected either between the mud motor and the drill bit or above the mud motor and the drill bit. Such bent housings are designed to provide an annular deviation in the BHA to directionally orient drilling action at the drill bit. A surface adjustable bent housing may be adjusted to a particular setting by tripping the drillstring and setting the bent housing to impart a desired angular deviation to the well.

A downhole adjustable bent housing offers savings in rig time and well costs because it is adjustable without being removed from the well. A downhole adjustable bent housing that is positionable, or deployable, from the surface can be used to efficiently influence the drop or build angle of the boring direction of the drill bit. The angle of attack of the drill bit and the resulting direction of the well can be guided using the downhole adjustable bent housing.

It is well known in the drilling industry how to obtain reliable three-dimensional location data for the bottom of the well being drilled. The driller compares this information with the target bottom hole location to determine needed adjustments in the path of the well, and the adjustments to the direction of drilling of the well may be made using the present invention.

Prior art surface adjustable bent housings use a complicated series of three connected housings that rotate independently to provide varying configurations from aligned to bent relative to the BHA. These tools require complex schemes for controlling rotational positions of each housing.

It is therefore an object of the present invention to provide a downhole adjustable bent housing that can be easily and repeatedly deployed or retracted by controllable changes made at the surface in hydraulic mud pressure in the drillstring.

It is a further object of the present invention to provide a downhole adjustable bent housing that can be adjusted without the use of wired or cabled control systems that complicate drilling operations, and that is reliable and simple to deploy and retract.

It is a further object of the present invention to provide a downhole adjustable bent housing that, once locked into its deployed position, allows the driller freedom to change the rate of the mud pumps without affecting the deployed condition of the tool.

It is a further object of the present invention to provide a downhole adjustable bent housing that provides the driller with reliable detection of the deployed or retracted status of the tool.

SUMMARY OF THE INVENTION

The above-described objects of the present invention, as well as other objects and advantages, are achieved by a downhole adjustable bent housing that is deployed and retracted by the driller by using the mud pumps located at the surface and used to circulate drilling mud in the well during the drilling process. The present invention does not require wires, cables or cumbersome reciprocation of the entire drillstring to deploy, lock or re-align the downhole adjustable bent housing, and the downhole adjustable bent housing is controllably deployed and realigned without a trip using hydraulic pressure provided by the mud pumps. The present invention provides the driller with readily available information regarding the status of the tool (aligned or deployed, and to what extent), utilizes existing mud pumps as its source of control, and is compatible with existing mud motors and other downhole equipment. The present invention provides reliable deployment and re-alignment of the downhole adjustable bent housing without interfering, with the mechanical transfer of transmission shaft power from a mud motor connected above the tool to a drill bit connected below the tool.

The present invention provides a surface-operated downhole adjustable bent housing with a bendable housing and a hydraulically actuated, tubular mandrel that engages and displaces an articulating member which, when actuated by the mandrel, sets or deploys the downhole adjustable bent housing, into its bent, or non-aligned configuration. The downhole adjustable bent housing comprises a mandrel housing 33 and a member housing 34 joined at a knuckle or joint to form a bendable housing. The housings and the knuckle provide a common center passage accommodating a transmission shaft providing power from the mud motor to the drill bit, and provide substantial rigidity to the bendable housing structure in its inactive and deployed configurations. Under the bending force provided by mechanical interaction of the mandrel and the articulating member, the joined sections of the housing are made to angularly deviate one relative to the other to form a slight angle in the downhole adjustable bent housing.

The mandrel is reciprocally disposed within a mandrel housing, but protrudes through an opening in the knuckle and into a passage in the articulating member pivotally secured in the member housing. When actuated, the mandrel overcomes a return spring that biases the mandrel towards its inactive position. The mandrel is hydraulically actuated to cycle through a number of predetermined positions to allow drilling with the downhole adjustable bent housing in either the deployed (bent) or inactive (aligned) configurations. For example, the mandrel can be hydraulically actuated from its inactive position (spring force exceeds the mud pressure forces on the mandrel) to an intermediate position (mandrel displaced into contact with the passage of articulating member, but no deployment of the downhole adjustable bent housing), back to the inactive position, and later to its deployed position (mandrel displaced further to enter the passage in the articulating member to deploy the bent housing).

The mandrel is actuated towards the articulating member by exposing the mandrel to at least a threshold drilling mud pressure applied through the drillstring by the mud pumps at the surface. When the drilling mud pressure overcomes the opposing return spring force, the mandrel is displaced to the extent allowed by the rotational position of the control collar as it engages a guide finger that is fixed to the housing. The mandrel is locked into its displaced position by the force of the mud pressure on the mandrel until the pressure is reduced below the threshold pressure. The mandrel is said to be "locked" into its intermediate (or deployed) position(s) only in the sense that the mandrel is hydraulically secured into its intermediate (or its deployed) position until the mud pressure drops below the threshold pressure and mud forces on the mandrel are overcome by the force of the return spring.

With a first actuation, the mandrel is displaced to its intermediate position by mud pressure axially displacing the mandrel and an attached rotating position control collar, such as a "J-slot" collar. The reciprocation of the mandrel is controlled by interaction of the control collar and the housing. The leading end, or nose, of the mandrel enters the receiving port of the articulating member and engages the passage therein without rotation of the articulating member or laterally displacing the articulating member. In this intermediate position, the contact between the nose of the mandrel and the articulating member provides additional rigidity to the downhole adjustable bent housing while drilling in a path defined by the tool in its undeployed configuration. The mandrel is unlocked from its intermediate position by reducing the pressure in the drillstring to below the threshold pressure and allowing the force of the return spring to stroke the mandrel back to its original, inactive position.

With a second actuation, the mandrel is displaced beyond its intermediate position to its deployed position. Again, the extent of travel of the mandrel is determined by the control collar, but the control collar has a different angular orientation relative to the housing. The controlled angular orientation of the control collar is provided by a series of interconnected grooves in the collar that interface with the guide finger, and the grooves allow further displacement of the mandrel to its deployed position on the second actuation. When actuated to its deployed position, the nose of the mandrel engages and forcibly aligns the passage in the articulating member with the shaft of the mandrel. The articulating member rotates to receive the shaft within the passage and is laterally displaced from its inactive position to its deployed position.

The downhole adjustable bent housing is biased towards its inactive (aligned) position by the knuckle or other biasing components that generally urge the mandrel housing and the member housing into axial alignment. More particularly, the space between the mandrel housing and the member housing is beveled on the tool face side to bias the two into axial alignment when the drill string is rotated. Also, beveled lock rings act to prevent bending once a straight position is achieved. The passage in the articulating member is not axially aligned with the mandrel when the downhole adjustable bent housing is in its inactive, aligned configuration. The passage in the articulating member is adapted at its receiving port to receive the nose of the mandrel upon deployment of the downhole adjustable bent housing. The nose of the mandrel and the receiving port of the articulating member are tapered or contoured to rotate the articulating member to generally align the passage for further receiving of the mandrel, thereby directing the end of the mandrel towards the passage. As the mandrel is forced into its deployed position within the passage of the articulating member, a misalignment between the shaft of the mandrel and the wall of the passage causes sliding interference between the mandrel and the articulating member as the mandrel moves to its deployed position. The sliding interference results in a lateral force on the articulating member as the mandrel thrusts into the passage. The forced alignment of the previously axially misaligned passage of the articulating member provides a lateral bending force that is transferred to the member housing through supports pivotally securing the articulating member within the member housing. The transfer of force to the member housing overcomes the biasing alignment of the knuckle or other components tending to align the mandrel housing and the member housing, thereby bending the downhole adjustable bent housing and deploying the tool.

The articulating member may be pivotally disposed within the member housing using axle ears located on opposite lateral sides of the articulating member. These axle ears are generally aligned one with the other, and may be pivotally received within recesses on the inside wall of the member housing. The lateral force imparted to the articulating member by the mandrel as it is received into the passage is transferred through the axle ears to the member housing. The lateral force imparted to the member housing causes the downhole adjustable bent housing to bend at the knuckle so that the member housing, and the connected drill bit, are out of alignment with the mandrel housing. This deployed configuration of the downhole adjustable bent housing is used for imparting a curve, or angular deviation, to the well being drilled. As drilling on a curved path progresses with the tool in the deployed configuration, the articulating member and the mandrel remain locked in their deployed position by the force of the drilling mud pressure bearing on the mandrel until the drilling mud pressure is reduced below the threshold pressure. After the mandrel is unlocked from its deployed position, the force of the return spring causes the mandrel to withdraw from the passage and move towards its inactive position. The control collar rotates during each induced angular rotation of the collar to cycle the downhole adjustable bent housing through the inactive, intermediate and deployed positions as needed to deviate the well in the desired path. It should be recognized that other and further actuation cycles can be envisaged, such as a cycles adding a third actuated position achieving partial deployment of the downhole adjustable bent housing.

DESCRIPTION OF DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1A:
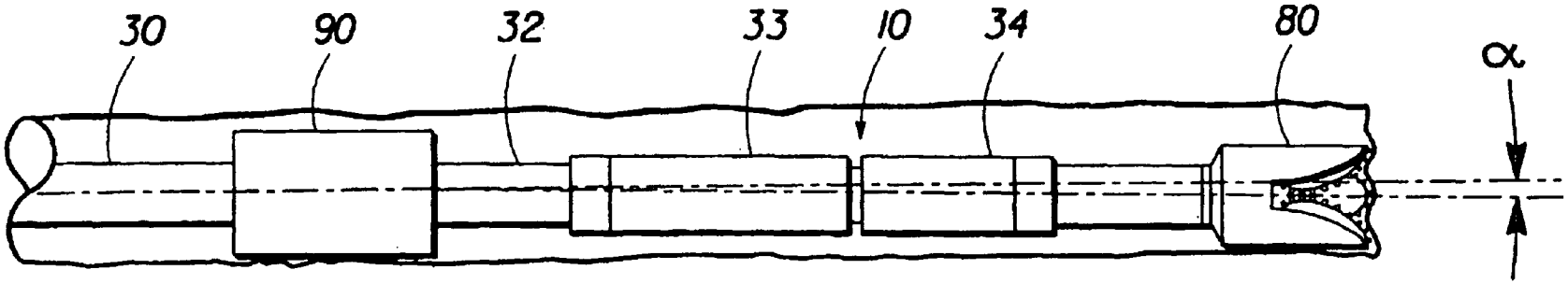
FIG. 1A is an elevation view of a downhole adjustable bent housing according to the present invention imparting a slight downward angle to the drill bit to drop angle, or turn the well downwardly, from its existing path.
Figure 1B:
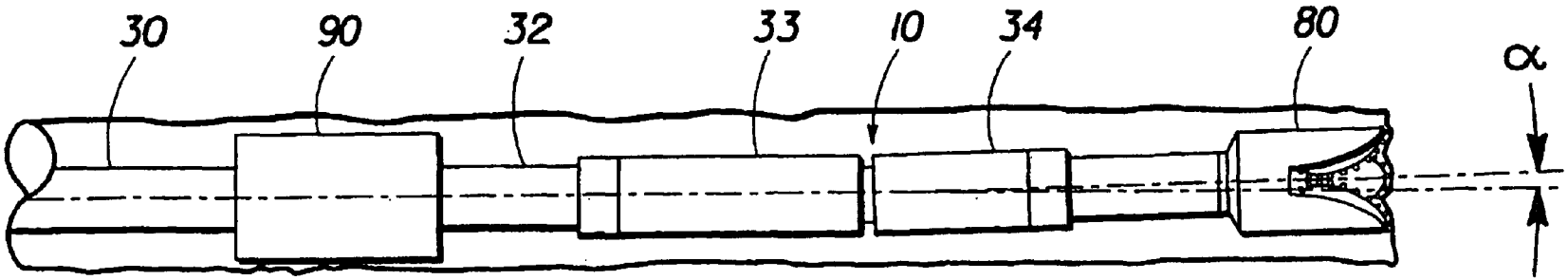
FIG. 1B is an elevation view of a downhole adjustable bent housing according to the present invention imparting a slight upward angle to the drill bit to build angle, or turn the well upwardly, from its existing path.

FIG. 1A shows a downhole adjustable bent housing 10 connected between a mud motor and a drill bit in accordance with the present invention. The downhole adjustable bent housing 10 in this configuration is set to have a slight downward angular deviation, thereby influencing the drill bit to drop angle, or turn downwardly, from its existing path. FIG. 1B shows how the downhole adjustable bent housing 10 may impart an upward angular deviation to the BHA that affects the angle of attack of the bit against the bore wall. The angular deviation imparted by the downhole adjustable bent housing 10 is a slight upward angular deviation thereby influencing the drill bit to build angle, or turn upwardly, from its existing path.

Figure 2A:
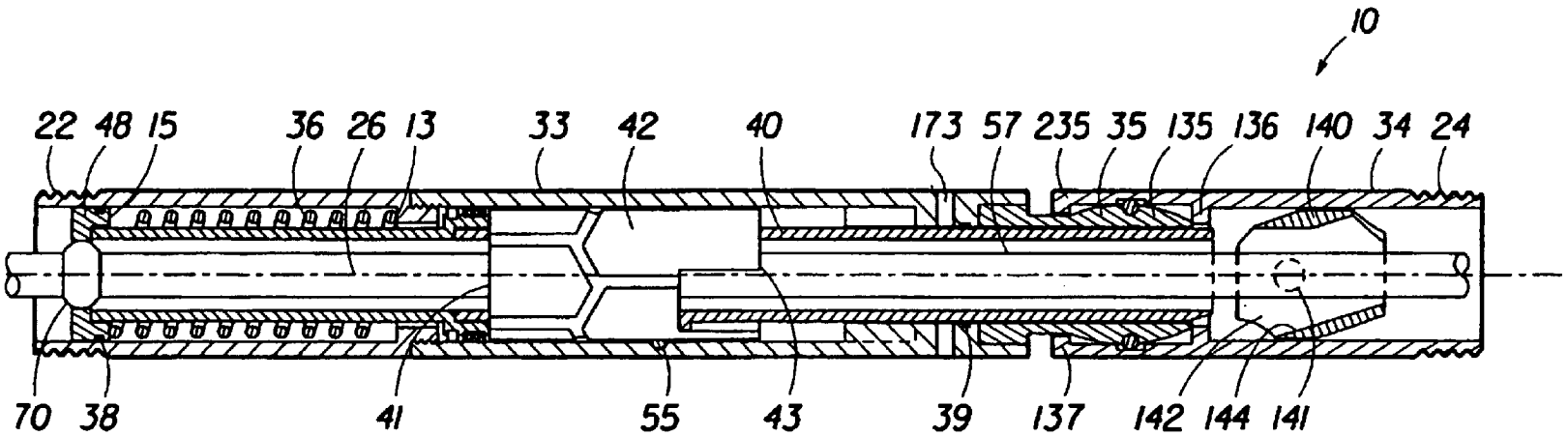
FIG. 2A is a detailed, cross-sectional side view of the downhole adjustable bent housing of FIGS. 1A–1B in an inactive, aligned position.

FIG. 2A shows the general configuration of a preferred embodiment of the downhole adjustable bent housing 10, in its inactive position. The downhole adjustable bent housing 10 has a mandrel housing 33 and a member housing 34 pivotally joined at a knuckle 35. The knuckle 35 can be any of several pivoting connections including a ball and socket connection or a flexible sleeve connection. The knuckle 35 shown in FIGS. 2A through 2D comprises a ball portion 135 extending from the mandrel housing 33 into a socket portion 235 formed in the member housing 34. The mandrel housing has a threaded proximal connection 22 disposed at the end of the mandrel housing 33 opposite the knuckle 35 for connection to a drillstring 30 (See FIGS. 1A, 1B). The member housing 34 has a threaded distal connection 24 disposed at the end of the member housing 34 opposite the knuckle 35 for connection to the drill bit 80 (See FIGS. 1A, 1B). When the downhole adjustable bent housing 10 is in its inactive, aligned position, the centers of the proximal connection 22 and the distal connection 24 generally define a common axis 26.

Figure 5:
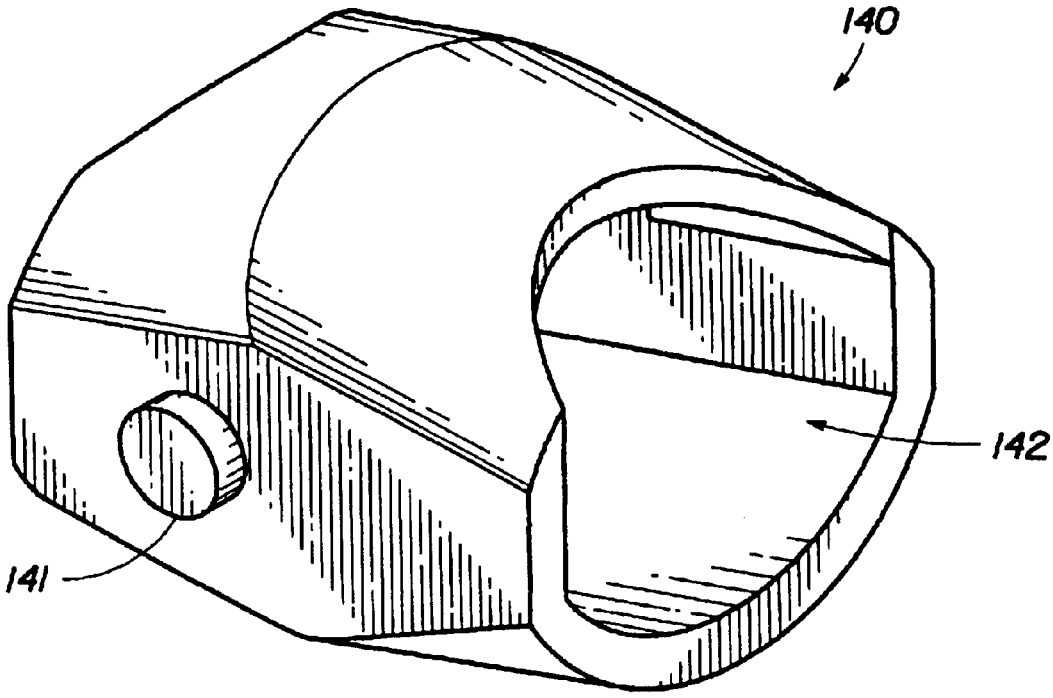
FIG. 5 is a perspective view of an articulating member according to a preferred embodiment of the present invention.
Figure 6:
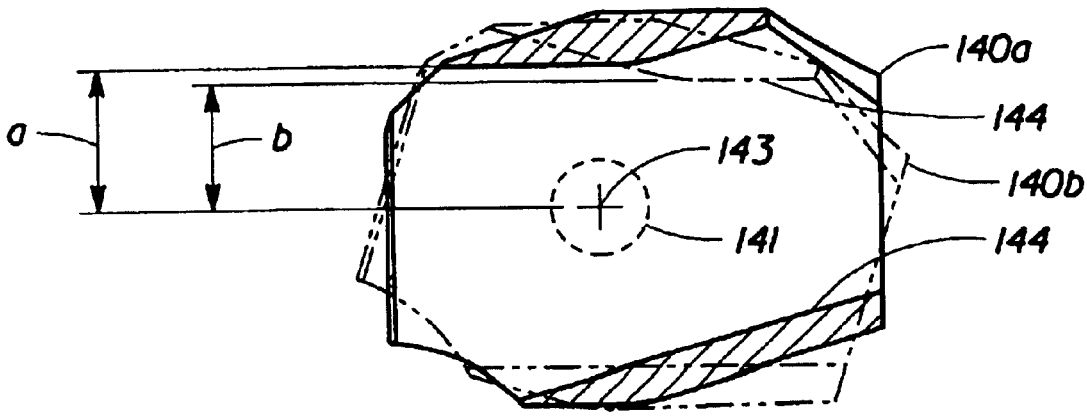
FIG. 6 is a cross-sectional side view of the articulating member in its inactive and deployed (phantom lines) positions.

An articulating member 140, shown in greater detail in FIG. 5, has a pair of axle ears 141 for engaging the member housing 34 at mating pivot points (not shown) on the inside wall of the member housing 34. The centers of the axle ears 141 of the articulating member 140 form an axis 143, indicated in FIG. 6, that lies perpendicular to the axis 26 of the mandrel housing 33. The articulating member 140 pivots about the axis 143 as dictated by the engagement with the mandrel 40.

Figure 2B:
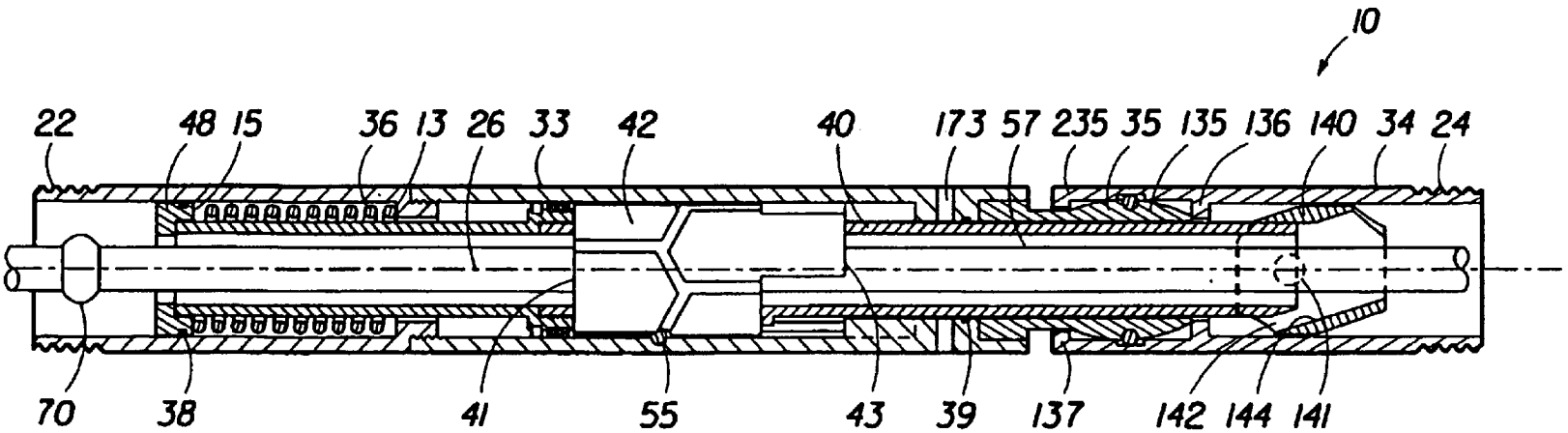
FIG. 2B is a detailed, cross-sectional side view of the downhole adjustable bent housing of FIGS. 1A–1B as the mandrel enters the receiving port of the articulating member.
Figure 2C:
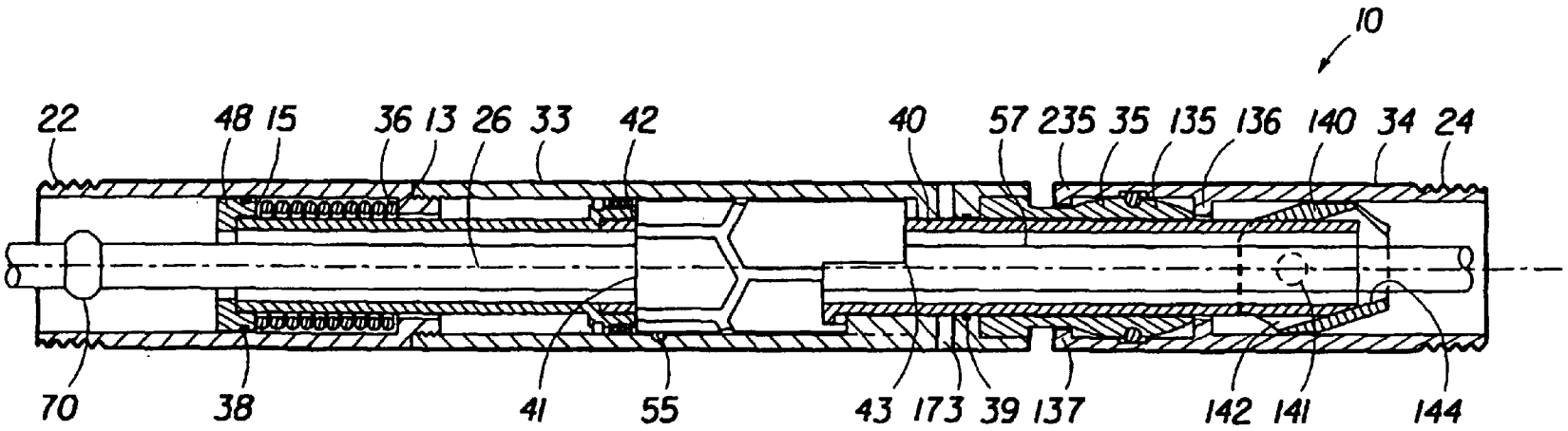
FIG. 2C is a detailed, cross-sectional side view of the downhole adjustable bent housing of FIGS. 1A–1B in its intermediate position as the nose of the mandrel contacts the inside wall of the passage in the articulating member.
Figure 2D:
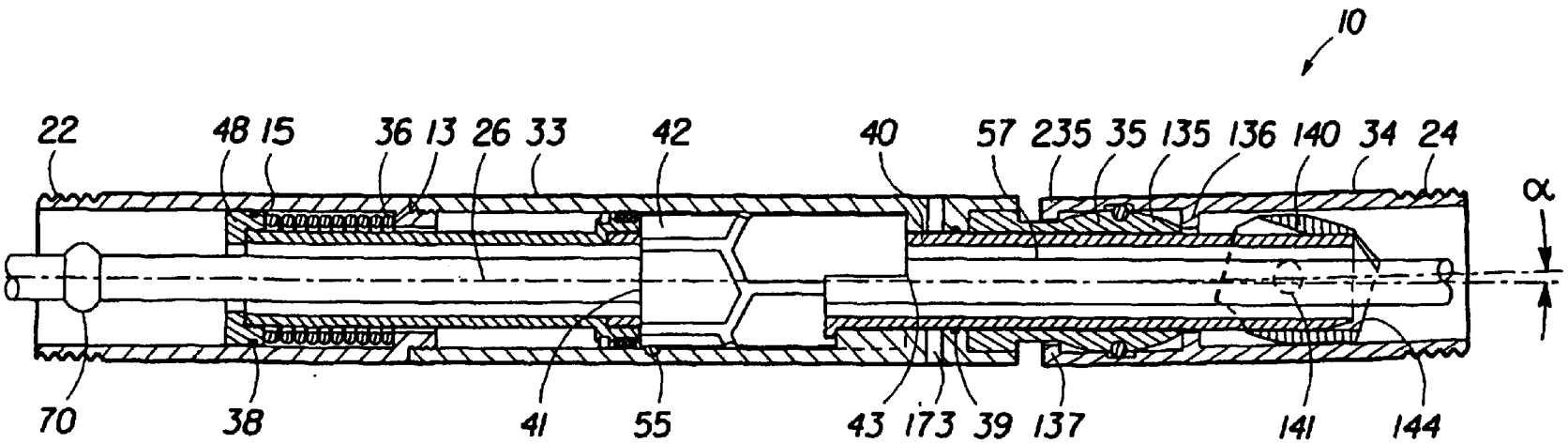
FIG. 2D is a detailed, cross-sectional side view of the downhole adjustable bent housing of FIGS. 1A–1B in the deployed position.

FIG. 2A shows the mandrel 40, the articulating member 140 and the downhole adjustable bent housing 10 all in their inactive and aligned positions. FIG. 2B shows the mandrel 40 moved into a first portion of the passage in the articulating member, the receiving port 142, but the nose of the mandrel 40 has not yet engaged the articulating member 140. FIG. 2C shows the mandrel 40 distally displaced against the force of the return spring 36 to its intermediate position, the articulating member 140 remaining in its inactive position, and the downhole adjustable bent housing 10 still in its aligned position. In its intermediate position shown in FIG. 2C, the mandrel 40 is fully received into the first portion of the passage, the receiving port 142, but has not yet entered into the second portion of the passage, receiving port 144, to deploy the tool. FIG. 2D shows the mandrel 40, the articulating member 140 and the downhole adjustable bent housing 10 all in their active and deployed positions (upward build angle). In its active, deployed position, the mandrel 40 is fully received into the second portion of the passage, port 144, after the articulating member 140 has rotated to align port 144 with the shaft of the incoming mandrel 40.

FIGS. 2A through 2D show the mandrel 40 with the rotating position control collar 42 rotatably received thereon, with both the mandrel 40 and the control collar 42 disposed within a chamber in the mandrel housing 33. The mandrel 40 has an axis 26 and an annular drillstring pressure sensing surface 48. The mandrel 40 and the control collar 42 axially reciprocate together with the chamber of the mandrel housing 33 along their axis 26.

The mandrel 40 controllably and cyclically moves between three positions as determined by the angular orientation of the control collar 42 relative to the mandrel housing 33. In the four-cycle embodiment described in this example, the positions of the mandrel 40 are the inactive position (FIG. 2A), the intermediate position (FIG. 2C), back to the inactive position (FIG. 2A), and the deployed position (FIG. 2D), in that order. In its deployed position shown in FIG. 2D, the mandrel 40 axially engages the articulating member 140 causing it to rotate the passage therein to receive the nose of the mandrel 40. The mandrel 40 is not normally aligned with the second portion of the passage, port 144, in the articulating member 140, and the resulting interference causes a lateral force on the articulating member 140 as the mandrel is received into the passage. The mandrel 40 forcibly aligns ports 144, rotating the articulating member 140 as it is forced into its deployed position. The forced alignment of passage or port 144 with the mandrel 40 rotates articulating member 140 from position 140a to position 140b, shown in FIG. 6, and laterally displaces the articulating member 140 and the member housing 34 in which the articulating member 140 is secured by an amount equal to the difference between lengths "a" and "b" in FIG. 6.

The responsiveness of the mandrel 40 can be enhanced through strategic placement of circumferential seals and equalization ports to provide a net differential force on the mandrel. FIGS. 2A through 2D show a proximal mandrel seal 38 and a distal mandrel seal 39 disposed in sliding contact with the mandrel 40. A proximal portion of the chamber of the mandrel housing 33 is in fluid communication with the drilling mud pressure in the drillstring 30. The portion of the chamber of the mandrel housing 33 between the proximal mandrel seal 38 and the distal mandrel seal 39 is isolated from the drilling mud pressure in the drillstring 30, but is in fluid communication with the annular mud pressure outside the housing through equalization port 173. The pressure in the drillstring 30, the pressure in the annulus, the force of the return spring 36, along with friction of the seals 38 and 39, all combine to influence the net axial force acting on the mandrel 40. The pressure in the drillstring 30 results from drilling mud being forcefully pumped down the drillstring 30 from the discharge of the mud pumps at the surface and the restriction at the bit nozzles. The mud pressure in the drillstring bears on the annular pressure sensing surface 48 of the mandrel 40 and urges the mandrel 40 from its inactive position towards either its intermediate or its deployed positions, depending on the orientation of the control collar 42 relative to the downhole adjustable bent housing 10.

The return spring 36 is disposed in contact with the mandrel housing 33 at a first circumferential spring shoulder 13 and with the mandrel 40 at a first circumferential ridge 15. The return spring 36 is placed under compression to urge the mandrel 40 towards its inactive position shown in FIG. 2A. The mandrel spring 36 is designed to elastically compress when the pressure in the drillstring 30 exceeds the threshold actuation pressure. The downhole adjustable bent housing 10 is secured in the desired intermediate (aligned) or deployed (bent) configuration during normal drilling operations as long as the drillstring pressure is above the threshold pressure necessary to overcome and compress the return spring 36. For example, the threshold actuation pressure may be any pressure that is great enough to compress the return spring 36. It should be recognized that the threshold actuation pressure is primarily determined by the amount of resistance in the return spring 36 and the net surface area of the annular pressure sensing surface 48, but is also influenced by the shape of the mandrel 40 and the annular pressure outside the downhole adjustable bent housing 10 adjacent to the equalization port 173.

Figure 3:
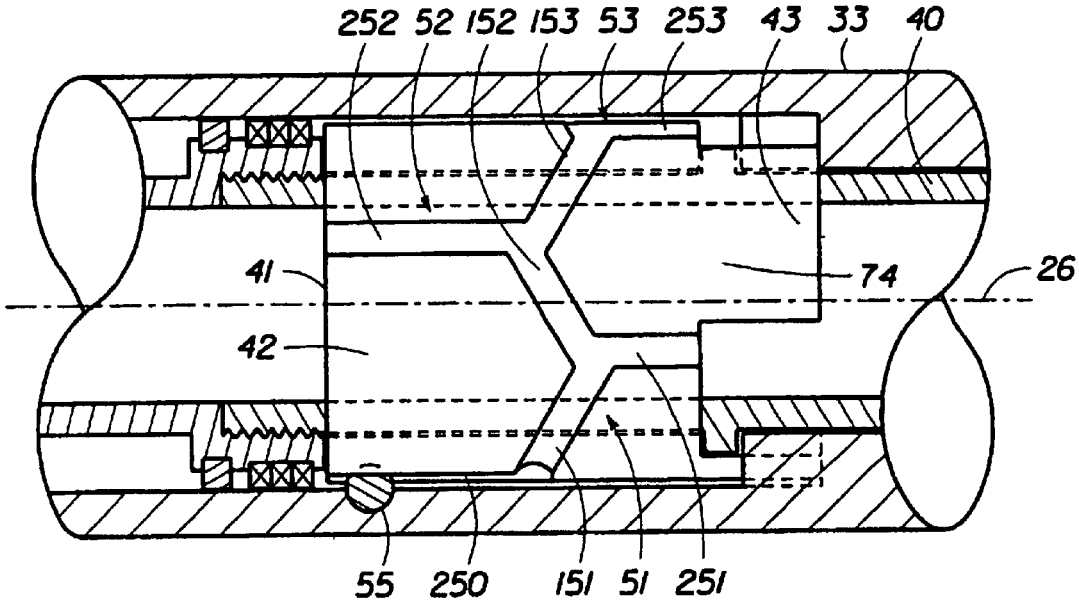
FIG. 3 is a side view of a four-stroke rotating position control collar.

As shown in FIG. 3, the control collar 42 has a proximal end 41 disposed toward the proximal end of the downhole adjustable bend housing 10 and a distal end 43 disposed toward the articulating member 140 and the distal connection 24 of the downhole adjustable bent housing 10. The control collar 42 is the device that enables the driller to controllably deploy and re-align the downhole adjustable bent housing 10 by varying the pressure in the drillstring 30 to reciprocate the mandrel 40. A series of interconnected grooves are machined into the radially outward surface of the control collar 42. In a simple four-stroke design, these grooves comprise two return grooves 50 (not shown) and 52 and two rotation grooves 51 and 53. The control collar 42 is axially fixed to the mandrel 40 and reciprocates within the mandrel housing 33 with the mandrel 40, but it is free to rotate about the axis 26 as guided by a protruding guide finger 55 in a fixed relationship to the mandrel housing 33. Throughout the four-position inactive-to-intermediate-to-inactive-to-deployed cycle of the mandrel 40, the guide finger 55 is maintained in rolling or sliding contact with the grooves in the control collar 42. As the control collar 42 and the mandrel 40 reciprocate within the housing 12, the guide finger 55 traverses the grooves in a path as dictated by the intersections of the grooves 50, 51, 52 and 53 and the reciprocation of the mandrel 40 within the mandrel housing 33.

The position of the mandrel 40 is controlled by manipulation of pressure in the drillstring 30. As shown in FIG. 2A–2C, when the pressure of the drilling mud in the drillstring 30 overcomes the opposing spring and friction forces urging the mandrel 40 towards the inactive position, the mandrel 40 is axially displaced towards its intermediate position. Following an intervening low mud pressure that allows the mandrel 40 to return to its inactive position as shown in FIG. 2A (each return to this position being indicated by the pressure drop resulting from upset 70 closely fitting within pressure sensing surface 48), the pressure of the drilling mud in the drillstring 30 is again increased to overcome the opposing forces urging the mandrel 40 towards its inactive position, and the mandrel 40 is displaced towards the deployed position shown in FIG. 2D. Although it is preferred that the pressure sensing surface 48 be disposed at the proximal end of the mandrel 40 adjacent to the proximal connection 22 to the drillstring 30, the pressure sensing surface 48 can be located at the distal end of the mandrel 40 or, using a proper arrangement of seals, at any point therebetween. It should also be recognized that by strategic placement of seals, fluid communication passages and the pressure sensing surface, the mandrel 40 may actuate in either the proximal or the distal (uphole or downhole) directions.

The control collar 42 rotationally cycles through multiple positions as the mandrel 40 reciprocates within the downhole adjustable bent housing 40. The description that follows assumes that the control collar 42 is a four-stroke collar. The invention may be used with a two-stroke, six-stroke, eight-stroke or higher number of cycles, and the explanation of the four-stroke cycle does not limit the applicability or adaptability of the invention. For purposes of illustration, the control collar 42 is shown in FIGS. 3 and 4A through 4D in a cutaway perspective view to improve visualization of the interconnected grooves 50, 51, 52 and 53.

Figure 4A:
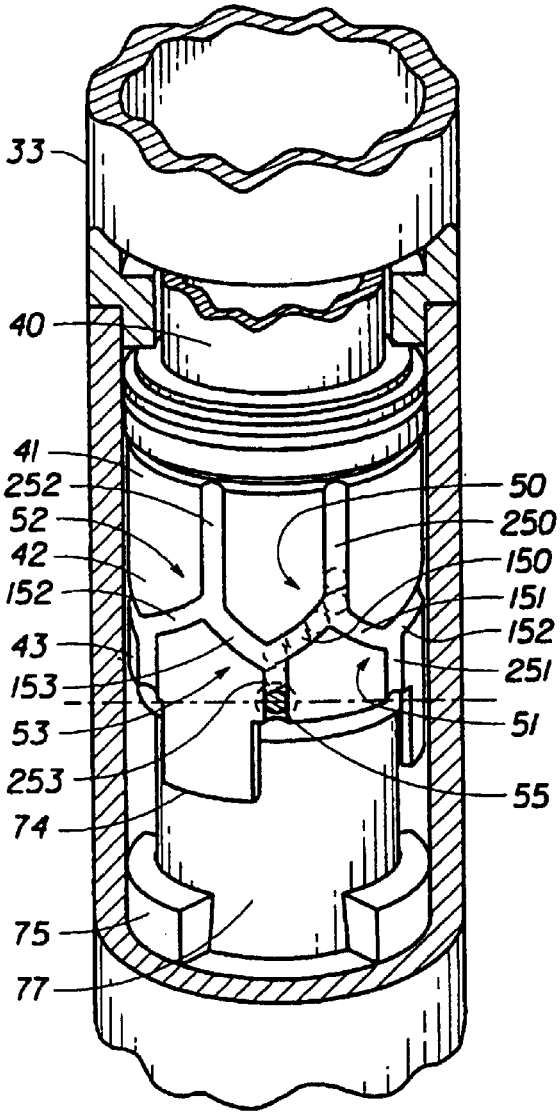
FIGS. 4A through 4D are a sequential series of side views showing a cycle of a control collar and its interaction with the guide finger.

When the downhole adjustable bent housing 10 is in its inactive position shown in FIG. 2A, the guide finger 55 is in rolling or sliding contact in the first actuation groove 50 near the distal end 43 of the collar 42 shown in FIG. 4A. The mandrel 40 begins its four-stroke cycle from its inactive position shown in FIG. 2A. From the inactive position, the mandrel 40 is actuated against the mandrel spring 36, by exposure of the pressure sensing surface 48 to a threshold pressure, beyond the position shown in FIG. 2B to its intermediate position shown in FIG. 2C. As this first actuation stroke of the mandrel 40 begins, the control collar 42 moves distally relative to the guide finger 55. The guide finger 55 initially rolls or slides toward the proximal end 41 of the control collar 42 within the second leg 253 of the second actuation groove 53 to the intersection of the second actuation groove 53 and the first leg 150 of the first actuation groove 50. When the guide finger 55 reaches that intersection, it slides or rolls into the first leg 150 of the first actuation groove 50 toward the intersection of the first actuation groove 50 and the first leg 151 of the first return groove 51. The first leg 150 of the first actuation groove 50 is not aligned with the axis 26 of the control collar 42, and the sliding or rolling contact between the guide finger 55 and the first leg 150 imparts a moment causing the control collar 42 to rotate about its axis 26. The second leg 250 (not shown) is not aligned with the first leg 150 and is generally aligned with the axis 26. When the guide finger 55 leaves the first leg 150 and enters the second leg 250, the guide finger 55 slides or rolls within the second leg 250 to a point near the proximal end 41 of the control collar 42. At this position, the downhole adjustable bent housing 10 is in the intermediate position shown in FIG. 2C. Since the second leg 250 is generally aligned with the axis 26 of the control collar 42, there is little or no rotation of the collar 42 as the guide finger 55 slides within the second leg 250.

Figure 4B:
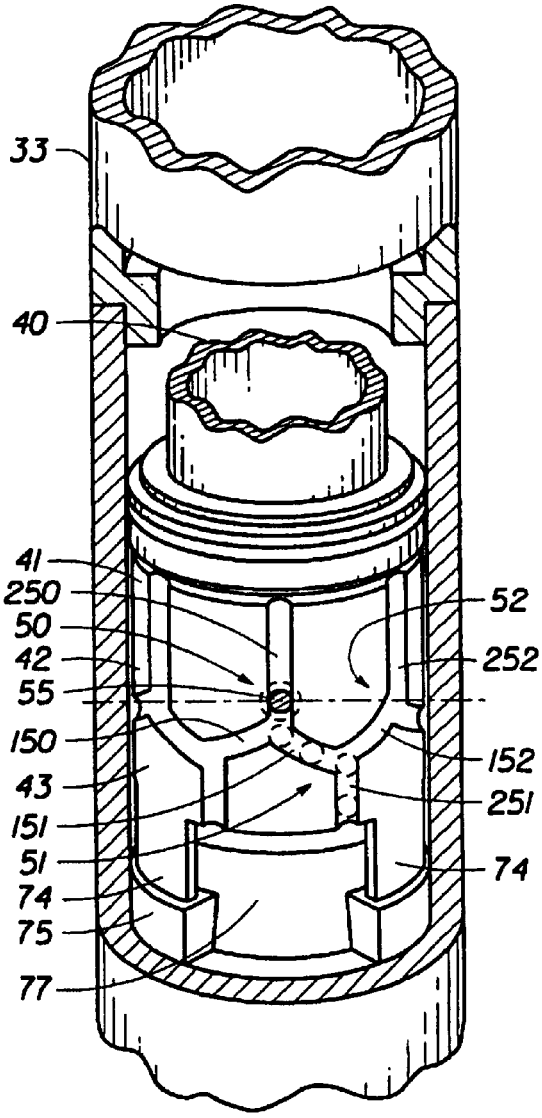

At the intermediate position shown in FIG. 2C, the protruding collar spacers 74 distally extending from the distal end 43 of the control collar 42 engage the second circumferential shoulder 75 on the inside wall of the mandrel housing 33 as shown in FIG. 4B. The spacers 74 thereby limit the movement of the control collar 42 and the rotatably attached mandrel 40 from actuating beyond the intermediate position.

Figure 4C:
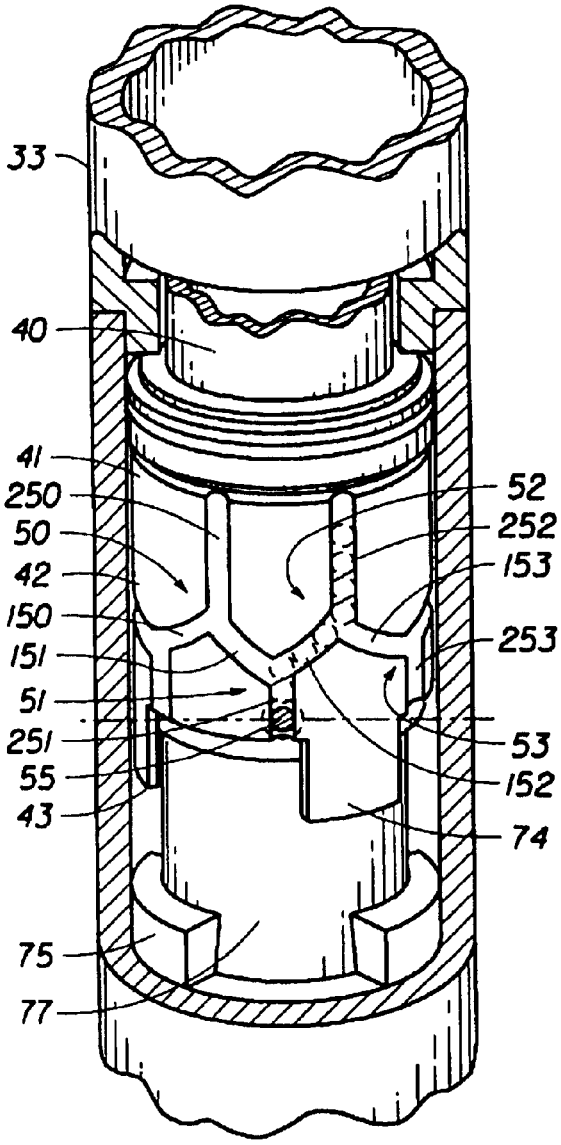

When the pressure in the drillstring 30 is reduced to below the threshold pressure, the mandrel 40 reverses direction and moves in the direction of the force applied by the return spring 36. This reversal begins the first return stroke of the control collar 42. As the return spring 36 returns the mandrel 40 to or near its inactive position, the guide finger 55 slides or rolls within the second leg 250 toward the intersection of the first actuation groove 50 and the first leg 151 of the first return groove 51. The first leg 151 of the first return groove 51 is not aligned with the axis 26 of the mandrel 40, and sliding or rolling contact between the fixed guide finger 55 in the first leg 151 causes the control collar 42 to further rotate about the axis 26. The rotation of the control collar 42 during the first return stroke is in the same angular direction as the rotation caused by the guide finger 55 sliding or rolling within the first leg 150 during the first actuation stroke. The intersection of the first actuation groove 50 and the first leg 151 of the first return groove 51 directs the guide finger 55 from the second leg 250 of the first actuation groove into the first leg 151 of the first return groove 51. As the mandrel 40 is displaced by the force of the mandrel spring 36 toward its inactive position, the guide finger 55 slides or rolls within the first leg 151 of the first return groove 51 towards the intersection of the first return groove 51 and the first leg 152 of the second actuation groove 52. The second leg 251 of the first return groove 51 is generally aligned with the axis 26 of the mandrel 40 and, as the guide finger 55 moves from the first leg 151 to the second leg 251, there is little or no rotation of the control collar 42. As the mandrel 40 returns to its inactive position under the force of the return spring 36, the guide finger 55 slides or rolls within the second leg 251 of the first return groove 51 to a point near the distal end 43 of the control collar 42 as shown in FIG. 4C. As the mandrel 40 returns to or near its inactive position, the rotational moment imparted to the control collar 42 by interaction with the tracking guide finger 55 causes the control collar 42 to rotate into the position shown in FIG. 4C. This inactive position occurs between the intermediate position shown in FIG. 2C and the deployed position shown in FIG. 2D, and the rotation of the control collar 42 has rotatably aligned the spacers 74 to be received within the recesses 75 when the tool is next actuated.

When the pressure in the drillstring 30 is again raised above the threshold pressure necessary to overcome the return spring 36, the mandrel 40 is distally displaced to begin the second actuation stroke to deploy the downhole adjustable bent housing 10. The second actuation stroke begins as the axial movement of the control collar 42 reverses and the guide finger 55 slides or rolls within the second leg 251 of the first return groove 51 toward the proximal end 41 of the control collar 42. The second leg 251 intersects the first leg 152 of the second actuation groove 52. The first leg 152 is not aligned with the axis 26 of the control collar 42, and as the guide finger 55 passes into the first leg 152 of the second actuation groove 52, it contacts and slides along the edge of the first leg 152 that is disposed towards the proximal end 41 of the control collar 42. The first leg 152 is not aligned with the axis of the mandrel 40, and as the guide finger 55 slides or rolls within the first leg 152, the control collar 42 rotates about its axis 26. The rotation of the control collar 42 during the second actuation stroke in the same angular direction as its previous rotations during the first actuation stroke and the first return stroke. The rotation of the control collar 42 as the guide finger 55 slides or rolls within the first leg 152 causes the spacers 74 to become rotatively aligned with, and received into, the recesses 77 in the second circumferential shoulder 75 on the inside wall of the mandrel housing 33. The guide finger 55 enters the intersection of the first leg 152 and the second leg 252 of the second actuation groove 52 and the first leg 153 of the second return groove 53. The motion of the mandrel 40 towards the distal end of the mandrel housing 33 causes the guide finger 55 to enter into the second leg 252 of the second actuation groove 52 of the control collar 42. The second leg 252 of the second actuation groove 52 is generally aligned with the axis 26 of the mandrel 40, and there is little or no rotation of the control collar 42 as the guide finger 55 slides within the second leg 252 to the point near the proximal end 41 of the control collar 42 shown in FIG. 4D.

At the end of this second actuation stroke the spacers 74 extending from the distal end 43 of the collar 42 are received within the recesses 77 in the second circumferential shoulder 75 of the mandrel housing 33. The alignment of the spacers 74 and the recesses 77 allow the control collar 42 and the mandrel 40 to actuate beyond the intermediate position shown in FIG. 2C to the deployed position shown in FIG. 2D. The position of the control collar 42 and the mandrel 40 shown in FIG. 4D correspond to the deployed position of the stabilizer shown in FIG. 2D. As the spacers 74 are received into the recesses 77, the mandrel 40 engages and displaces the articulating member 140. As the mandrel 40 engages the articulating member 140, the bending force needed to deploy the downhole adjustable bent housing 10 is transferred from the mandrel 40 to the member housing 34 through the articulating member 140 and its axle ears 141.

The mandrel 40, the articulating member 140 and the downhole adjustable bent housing 10 all remain in their deployed positions shown in FIG. 2D as drilling in the deviated direction progresses. Pressurized drilling mud flows into the mandrel housing 33 at the proximal connection 22, through the knuckle 35 and exits the member housing 34 at the distal connection 24. Drilling mud flows through the downhole adjustable bent housing 10 through a series of passages (not shown) running the length of the tool or through the tubular interior of the mandrel 40 and the articulating member 140, or some combination thereof. One or more of these drilling mud passages may be closed or restricted when the downhole adjustable bent housing 10 is in its deployed configuration, thereby providing a backpressure detectable at the surface for determining the position (intermediate or deployed) of the tool.

When the pressure in the drillstring 30 is again reduced below the threshold pressure, this begins the second return stroke, the final stroke of the cycle. At the onset of the second return stroke, the mandrel 40 again reverses direction and returns to its original inactive position shown in FIG. 2A.

On the second return stroke, the guide finger 55 slides or rolls within the second leg 252 of the second actuation groove 52 toward the distal end 43 of the control collar 42 toward the intersection of the second actuation groove 52 and the first leg 153 of the second return groove 53. The guide finger 55 passes from the second leg 252 of the second actuation groove 52 into the first leg 153 of the second return groove 53. The first leg 153 is not aligned with the axis 26 of the mandrel 40, and as the control collar 42 and mandrel 40 are axially displaced relative to the guide finger 55, the guide finger 55 slides or rolls along the edge of the first leg 153 disposed towards the distal end 43 of the control collar 42. As the guide finger 55 slides or rolls within the first leg 153, the control collar 42 angularly rotates in the same angular direction as its previous rotations during the first actuation stroke, the first return stroke and the second actuation stroke. As the guide finger 55 passes through the intersection of the second return groove 53 and the first leg 150 of the first return groove 50, the guide finger 55 enters the second leg 253 of the second return stroke 53. The second leg 253 is generally aligned with the axis 44 of the mandrel 40, and little or no rotation of the control collar 42 as the guide finger 55 slides or rolls within the second leg 253 to a point near the distal end 43 of the control collar 42 shown in FIG. 4A. This completes the four cycles of the control collar 42 selected for this example.

The articulating member 140 pivots within and relative to the member housing 34 about a pivot axis 143 defined by the axle ears 141. When port 144 is forcibly aligned with the mandrel axis 26 by insertion of the mandrel 40, the pivot axis 143 is laterally displaced relative to the mandrel axis 26. The lateral force applied to the articulating member 140 by the mandrel 40 is transferred through the axle ears 141 to the member housing 34, causing the downhole adjustable bent housing 10 to bend at the knuckle 35. The extent of the bend is determined by the physical dimensions of the housing, mandrel and articulating member, but is generally in the range up to 10 degrees, but most preferably in the range up to 2 degrees.

When the mandrel 40 is in its inactive position, port 144 of the articulating member 140 remains pivotally misaligned with the axis of the mandrel 40, but sufficiently positioned for non-interference with the transmission shaft 57 providing power from the mud motor 90 to the drill bit 80. When the downhole adjustable bent housing 10 is in the intermediate position shown in FIG. 2C, the transmission shaft 57 turns on its axis within the passage defined by the annular pressure sensing surface 48, the tubular interior of the mandrel 40, the passage 142 of the articulating member 140, and a port in the slotted support disk 136.

Figure 4D:
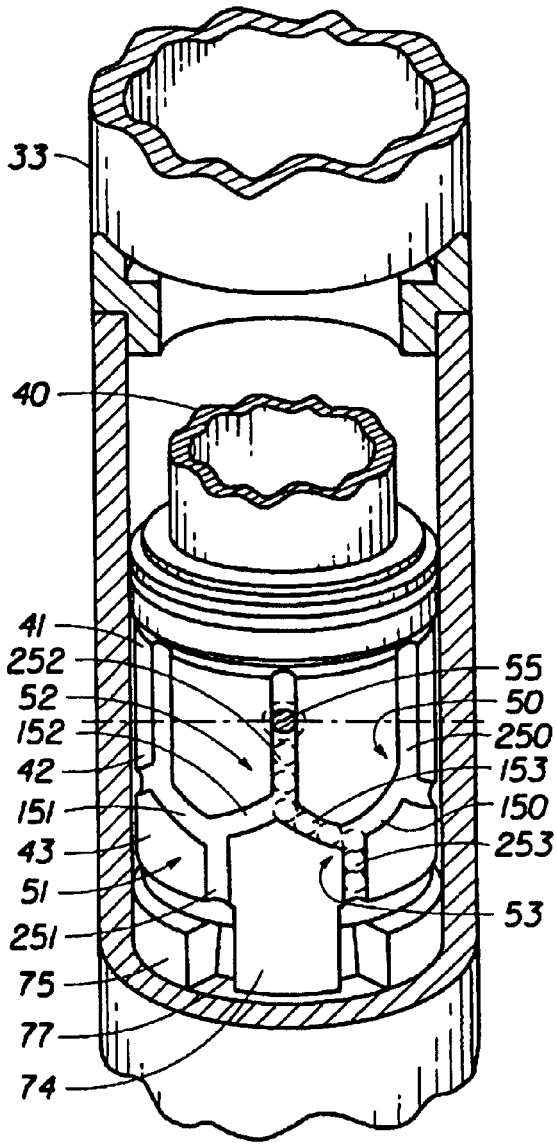

When the mandrel 40 is moved from the inactive position shown in FIG. 2A to the intermediate position shown in FIG. 2C, and then returned to the inactive position shown in FIG. 2A, the four stroke control collar 42 angularly rotates about one-half of a revolution. As further angular rotation of the control collar 42 occurs, the spacers 74 extending from the distal end 43 of the collar 42 are rotatively aligned with recesses 77 in the circumferential shoulder 75 on the inside wall of the mandrel housing 33. The alignment of these recesses 77 allow the mandrel 40, displaced by the drilling mud pressure bearing on the pressure sensing surface 48, to move beyond its intermediate position to its deployed position. As shown in FIGS. 2D and 4D, upon second actuation of the mandrel 40 from its inactive position, the mandrel 40 engages and laterally displaces the articulating member 140 and the member housing 34 toward their deployed positions. FIG. 3 shows a four-stroke rotating collar having two actuation grooves, a first actuation groove 50 (not shown) and a second actuation groove 52, and two return grooves, a first return groove 51 and a second return groove 53. This configuration is referred to as a four-stroke collar 42 because of the total number of interconnected grooves being four. By its nature as a cylindrical shape, the outside surface of the collar 42 into which the grooves are machined provides 360 degrees of angular rotation. Equal spacing of the four distinct strokes provides about 90 degrees per stroke. For a four stroke configuration described above, it is preferable to angularly space the first actuation groove and the first return groove within about 180 degrees of the outside angular surface of the collar and the second actuation groove and the second return groove within the remaining 180 degrees. In a four stroke configuration, the collar 42 "toggles" the mandrel 40 between the two actuated mandrel positions, the intermediate position shown in FIG. 2C and the deployed position shown in FIG. 2D.

The downhole adjustable bent housing 10 may be modified to include a higher number of positions in the cycle. For example, the control collar 42 could be modified to operate in six cycles by including a third actuation groove immediately followed by a third rotation groove angularly inserted between the second return groove 53 and the first actuation groove 50. In this six cycle configuration, each actuation groove and return groove pair will comprise approximately 120 degrees of the outside angular surface of the control collar 42 so that the control collar 42 accommodates three actuated mandrel positions instead of only two. The six-cycle collar would accommodate a second set of spacers corresponding to the second deployed position extending from the distal end of the collar and angularly spaced from the first set of spacers 74 corresponding to the first deployed position. The second set of spacers may be longer or shorter than the first set of spacers 74 to make the bend in the downhole adjustable bent housing 10 corresponding to the second deployed position different from the bend in the downhole adjustable bent housing 10 corresponding to the first deployed position. Conversely, a second set of recesses of different depth than the first set of recesses 77 in the second circumferential shoulder 75 may receive a second set of spacers in order to make the corresponding second deployed position impart a different angular bend from the first deployed position. Additional deployment positions and angular bends can be created by inclusion of additional spacers, actuation grooves and return grooves in correspondingly smaller angular portions of the collar.

By further "compressing" the pairs of actuation grooves and return grooves into angularly smaller portions of the collar, the control collar can be modified to provide more than one cycle of the stabilizer per revolution of the collar. For example, an eight stroke control collar wherein each pair of actuation grooves and return grooves are disposed within 45 degrees of the angular rotation of the collar may provide strokes 5 through 8 as a mirror image of strokes 1 through 4. That is, the control collar may be designed such that the first actuation stroke and the third actuation stroke displace the mandrel to identical intermediate positions, and the second actuation stroke and the fourth actuation stroke displace the mandrel to identical deployed positions. The design of the control collar, i.e. the number of deployed positions and the number of cycles per revolution, should take into consideration several factors affecting the operation of the rotating position control collar. These factors include, but are not limited to, the diameter of the control collar, the thickness of the grooves, the friction between the guide finger and non-aligned portions of the grooves and the overall displacement of the reciprocation of the mandrel within the housing.

The meaning of "groove", as that term is used herein, includes, but is not limited to, a groove, slot, ridge, key and other mechanical means of maintaining two parts moving relative to another in a fixed rotational, axial or aligned relationship. Further, the meaning of "mandrel", as that term is used herein, includes, but is not limited to, mandrels, pistons, posts, push rods, tubular shafts, discs and other mechanical devices designed for reciprocating movement within a defined space. The term "gauge" means diameter, thickness, girth, breadth and extension. The term "collar" means collars, rims, sleeves, caps and other mechanical devices rotating about an axis and axially fixed relative to the mandrel. "Slender" means little width relative to length. An "appendage" is a part that is joined or attached to a principal object. The term "port" means a passageway, slot, hole, channel, tunnel or opening. The term "finger" means a protruding or recessed guide member that allows rolling or sliding engagement between the housing 12 and the control collar 43 that maintains the housing 12 and the control collar 42 within a desired orientation one to the other, and includes a key and groove and rolling ball and socket.

While the foregoing is directed to the preferred embodiment of the present invention, other and further embodiments of the invention may be devised without departing from the basic scope thereof, and the scope thereof is determined by the claims which follow.

What is claimed is:

1. A directable apparatus for downhole directional drilling comprising:

a mandrel housing having a mandrel disposed within the mandrel housing, a biasing member for retracting the mandrel, and a collar coupling the mandrel with the mandrel housing to control pressure actuated extension of the mandrel between a first extended position and a second extended position; and a directable housing pivotally coupled to the mandrel housing, the directable housing having an articulating member pivotally secured therein, wherein the articulating member has a passage therethrough with a first portion for receiving the mandrel in the first extended position to lock the directable housing at a first angle relative to the mandrel housing and a second portion for receiving the mandrel in the second extended position to lock the directable housing at a second angle relative to the mandrel housing.

2. The directable apparatus of claim 1, wherein the first angle relative to the mandrel housing is zero, resulting in axial alignment.

3. The directable apparatus of claim 1, further comprising a transmission shaft extending through the mandrel and the articulating member.

4. The directable apparatus of claim 3, wherein the transmission shaft provides torque transfer between a mud motor and a drill bit.

5. The directable apparatus of claim 1, wherein the articulating member pivots about an axis generally perpendicular with an axis of the mandrel.

6. The directable apparatus of claim 1, wherein the articulating member has a range of pivoting that is constrained by contact between the articulating member and the directable housing.

7. The apparatus of claim 1, wherein the collar is a J-slot collar having an outwardly facing slot slidingly receiving a finger element therein, and a cylindrical body having one or more collar shoulders extending in the second axial direction for selective engagement with the one or more housing shoulders, wherein the outwardly facing slot is adapted to cause rotation of the collar upon reciprocating the collar in both the first and second axial directions, wherein the slot defines a repeating cycle that provides alignment of the one or more collar shoulders with the one or more housing shoulders upon a first fluid pressure actuation to prevent actuating the mandrel into engagement with the articulating member and misalignment of the one or more collar shoulders with the one or more housing shoulders upon a second fluid pressure actuation to actuate the mandrel into engagement with the articulating member and deploy the downhole adjustable bent housing.

8. The directable apparatus of claim 1, wherein the articulating member is pivotally secured within the housing by a pair of pivot pins.

9. The directable apparatus of claim 2, wherein the second angle is less than about 2 degrees from axial alignment.

10. An apparatus for use in directional drilling of wells comprising:

an elongate housing having a proximal section, a distal section, and a pivot joint connecting the proximal and distal sections;

an actuation shaft extending between the proximal section and the distal section through the pivot joint, the actuation shaft being selectively extendable between a first position and a second position;

an articulating member pivotally secured inside the distal section to define a pivot axis, the articulating member comprising an intersecting bore having an axial centerline that is perpendicular to and offset from the pivot axis, and a landing port adapted for receiving the distal end of the actuation shaft;

wherein extending the actuation shaft into contact with the landing port secures the distal section in axial alignment with the proximal section; and wherein extending the actuation shaft into axial alignment with the intersecting bore secures the distal section to the proximal section at an angle apart from axial alignment.

11. The apparatus of claim 10 wherein the actuation shaft is a tubular member with a rotating transmission shaft disposed therein.

12. The apparatus of claim 10 wherein the actuation shaft is displaced using drilling mud pressure.

13. The apparatus of claim 10, further comprising a means biasing the actuation shaft in the proximal direction.

14. The apparatus of claim 10, further comprising a locking member for securing the distal section in axial alignment with the proximal section.

15. The apparatus of claim 10, further comprising a rotating transmission shaft extending through the elongate housing generally along the axial centerlines of the proximal and distal sections of the elongate housing.

16. The apparatus of claim 15, wherein the transmission shaft comprises a proximal section and a distal section, the proximal section joined to the distal section at a universal joint.

17. A downhole adjustable bent housing for use in drilling operations, comprising:

a first housing section;

a second housing section;

a connector connecting said first housing section to said second housing section and permitting said second housing section to pivot relative to said first housing section;

[a mandrel extending between said first housing section and said second housing section through said connector and moveable between a retracted position and an extended position] *an actuation member movable in a generally axial direction with respect to the second housing section to an activated position*; *and*

[an articulating] *a* member [pivotally] secured within said second housing section[, said articulating member having a deviated passage therethrough for receiving said mandrel and being pivotal between a first, inactive position when the mandrel is in its retracted position and a second, deployed position when the mandrel is in its extended position, the deployed mandrel position inducing said second housing to pivot relative to said first housing] *at a position interfering with movement of the actuation member to the activated position, wherein axial movement of the actuation member through the member forces selective pivoting motion of said second housing section relative to said first housing section.*

* * * * *